July 7, 1970     D. VOLKMANN     3,519,186
SAFETY MECHANISM FOR PORTABLE FASTENER DEVICES
Filed Oct. 12, 1967     5 Sheets-Sheet 1

INVENTOR
DIETER VOLKMANN
by
Hibben, Noyes & Bicknell
ATTORNEYS

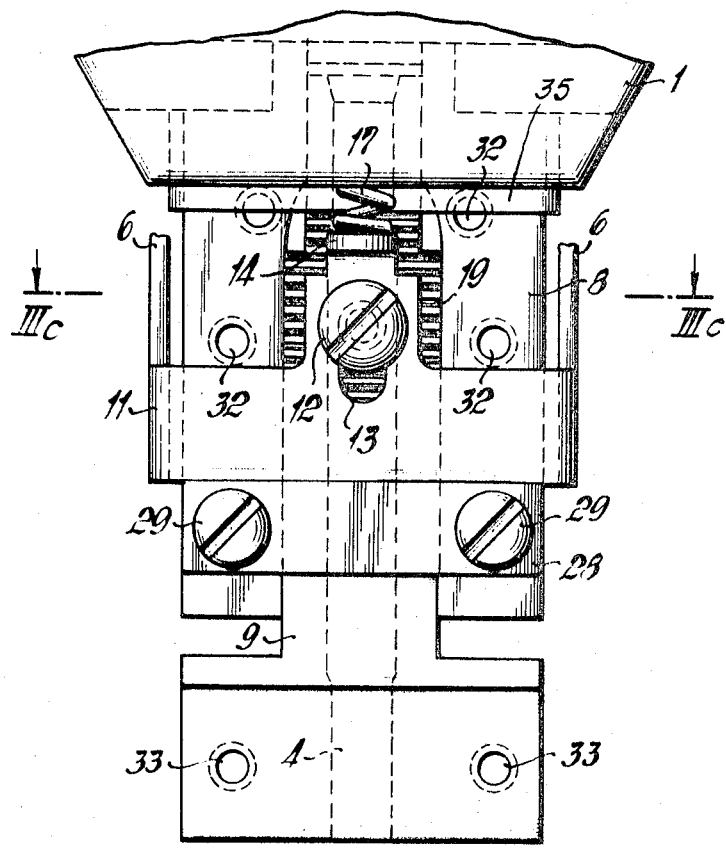
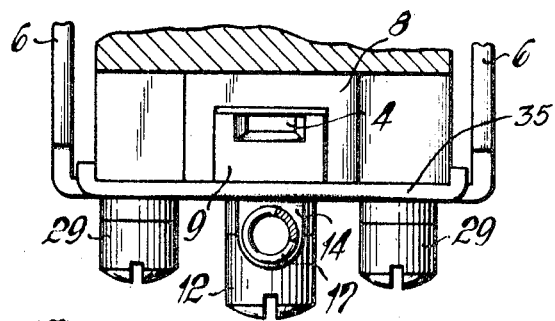
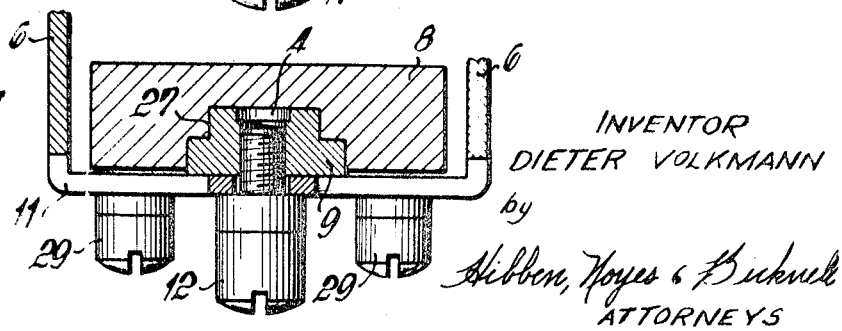

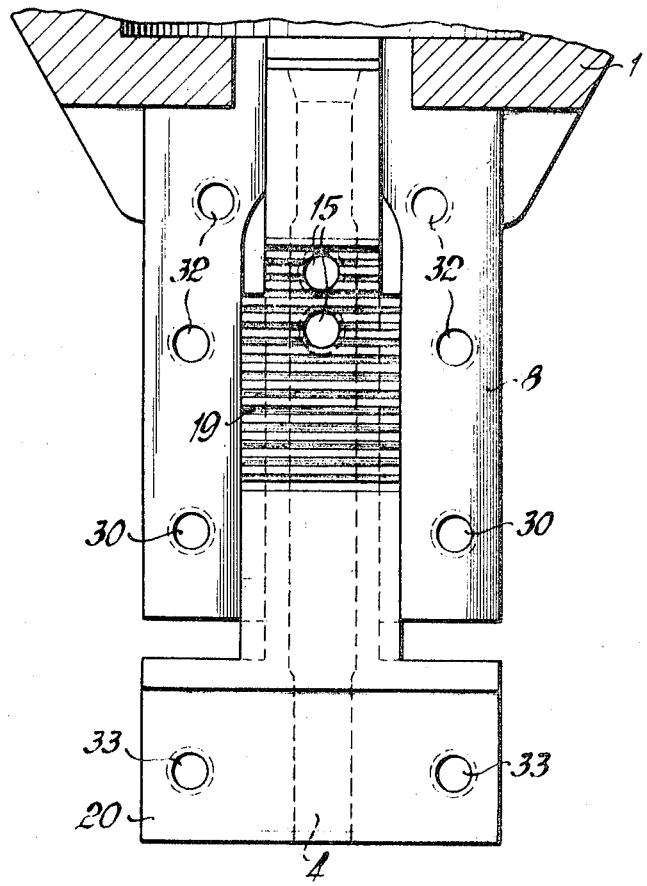

July 7, 1970  D. VOLKMANN  3,519,186
SAFETY MECHANISM FOR PORTABLE FASTENER DEVICES
Filed Oct. 12, 1967  5 Sheets-Sheet 5

INVENTOR
DIETER VOLKMANN
by
Hibben, Noyes & Bicknell
ATTORNEYS

United States Patent Office 3,519,186
Patented July 7, 1970

3,519,186
SAFETY MECHANISM FOR PORTABLE
FASTENER DEVICES
Dieter Volkmann, 49 Leinstrasse, Neustadt,
Rubenberge, Germany
Filed Oct. 12, 1967, Ser. No. 674,875
Claims priority, application Germany, Oct. 13, 1966,
H 60,740
Int. Cl. B25f 7/06
U.S. Cl. 227—8                                    5 Claims

ABSTRACT OF THE DISCLOSURE

In a portable pneumatic fastener driving device, to prevent unintentional ejection of a fastener when the device is not in working position, the trigger of the air admission valve is obstructed by a blocking mechanism connected with a plate which forms the front wall of a stable driving track and has limited movability. When the lower end of the plate is pressed against a workpiece, the trigger is unblocked. The plate is also adjustable for control of the extent of penetration of the fastener.

---

Figure 1:
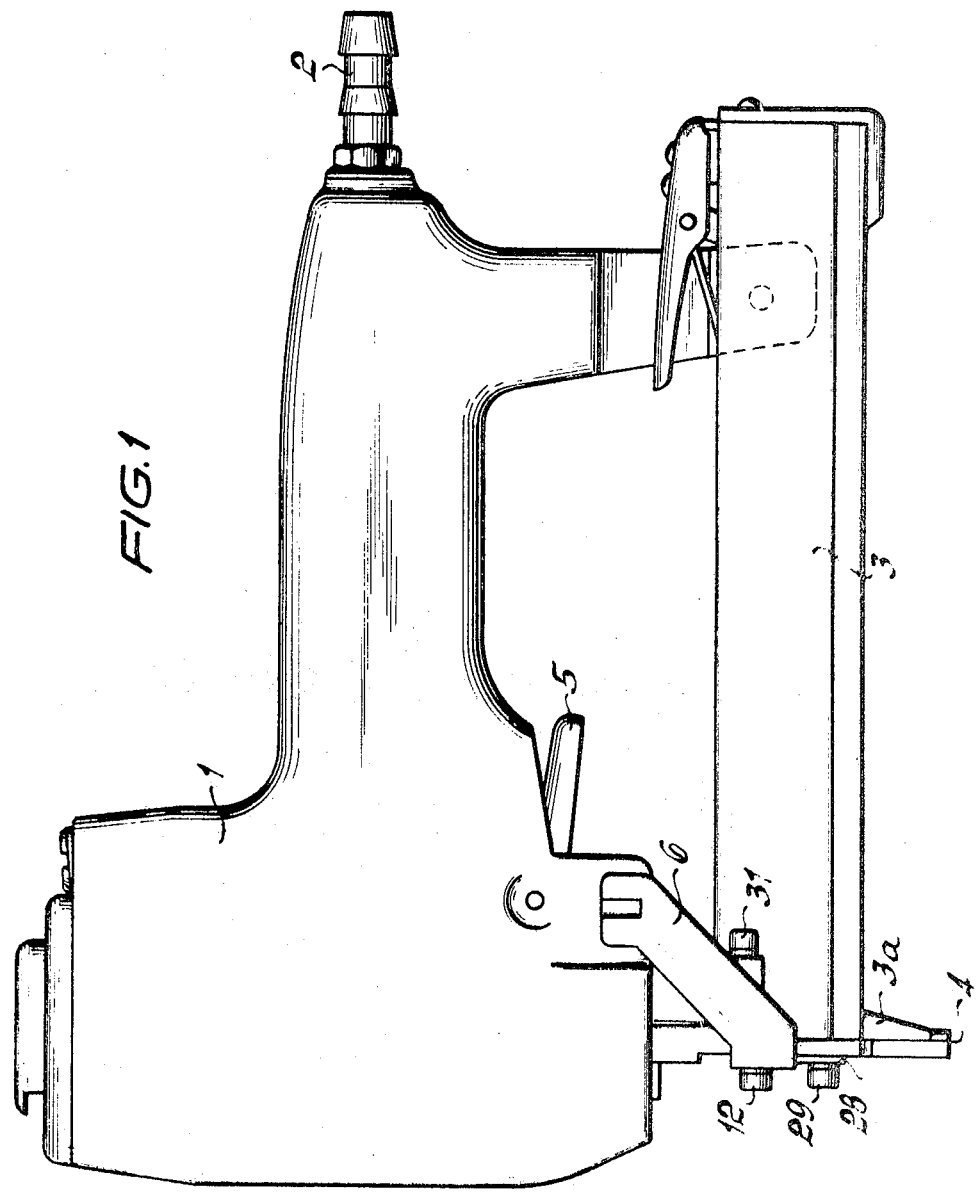

The invention relates to a safety mechanism for portable fastener driving devices which are operated by pneumatic force and by which staples, nails, studs, and the like are driven into workpieces, and it is the purpose of the invention to prevent driving a fastener when the device is not in working position and the nozzle of its staple drive track is not placed on a workpiece or other base into which the fasteners are intended to be driven.

Conventional safety mechanisms of the aforementioned type have a feeler which is secured to the staple drive track and cooperates with a locking device of the pneumatic control valve. The feeler usually projects beyond the nozzle of the staple drive track. When the nozzle of the staple drive track is pressed on the workpiece into which the fastener is to be driven, the feeler is pushed back, and this motion permits the control valve lever of the device to be operated. As the feeler is located at the nozzle of the drive track, the handling of the device, particularly where out-of-the-ordinary work is required, is rendered more complicated. In the construction industry, for instance, fastener driving devices are to an increasing extent used for various special types of fastening work in which the same device is operated with the same nozzle throughout, even though difficult fastening operations are required, such as at recessed or concealed points. In these circumstances the feeler of the safety mechanism at the nozzle prevents the device from being positioned closely enough to the point of work. In particular, this is the case, where other elements in addition to the staples must be fastened or where fastening operations are required at concealed points or in gaps. As the fasteners are laterally aligned in strip form until they are driven into the workpiece, the staple nozzle must be suitable for insertion into narrow and angular spaces. Also, it is desirable, in some instances, to be able to adjust the extent of penetration of the fastener into the workpiece in advance in order to avoid puncturing or pushing through the workpiece where soft materials, such as foils or artificial material, aerated plastics, and the like, are involved.

It is an object of the present invention to provide power operated devices of the described type in such a manner that no fastener can be ejected as long as the device is not in working position with its staple nozzle bearing on the workpiece.

Another object is to provide a safety mechanism for portable devices of the described type in such a manner that the device can be positioned in difficultly accessible work areas and the extent of penetration of the fastener into the workpiece can be regulated.

It is another object of the invention to enable additional or supplementary implements to be attached to the fastener driving device so that a variety of special fastening operations needed mainly in the construction industry can be carried out with the same fastener driving device.

These and other objects will become apparent from the following detailed description in connection with the accompanying drawings.

In the drawings

Figure 2:
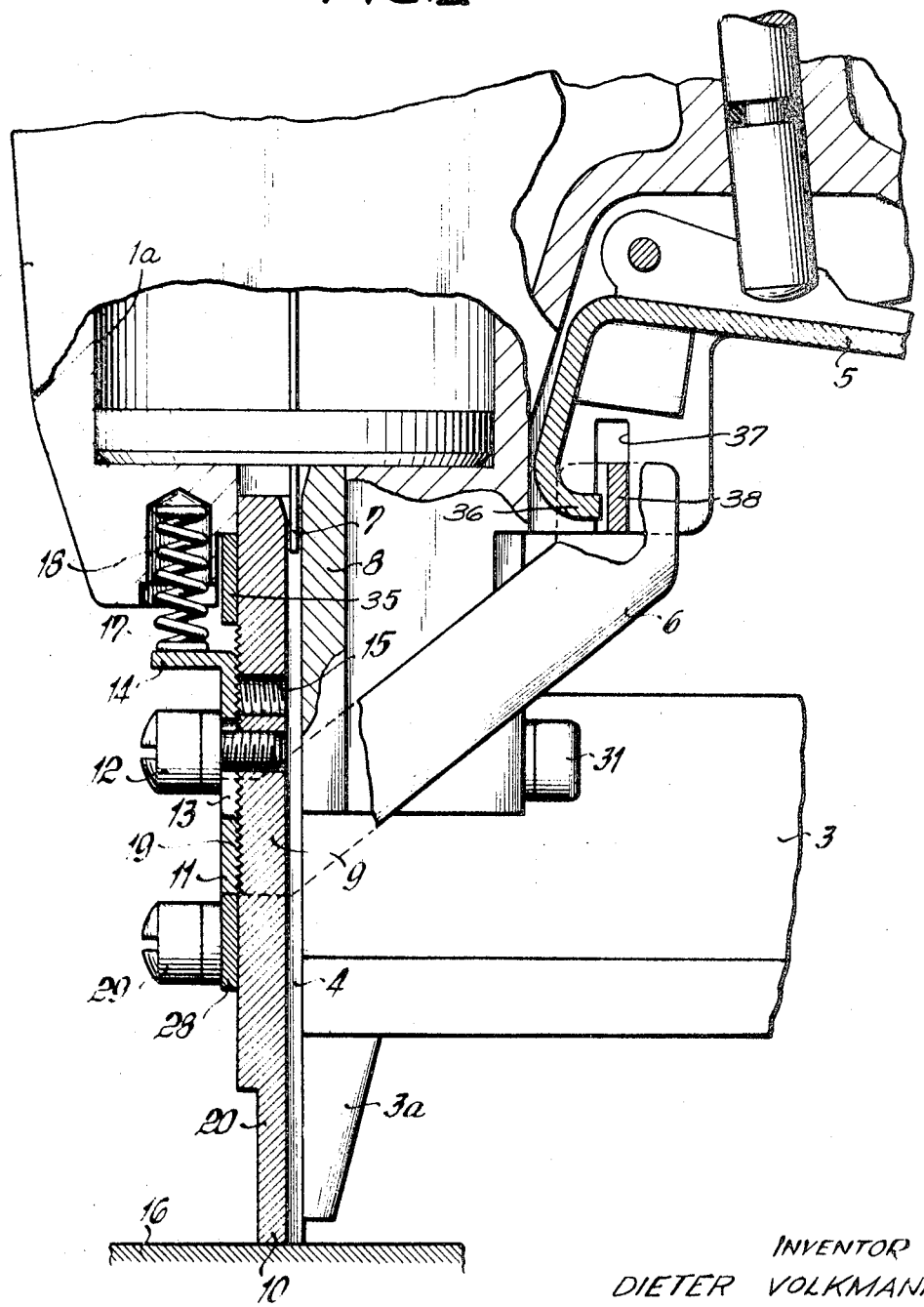
Figure 4A:
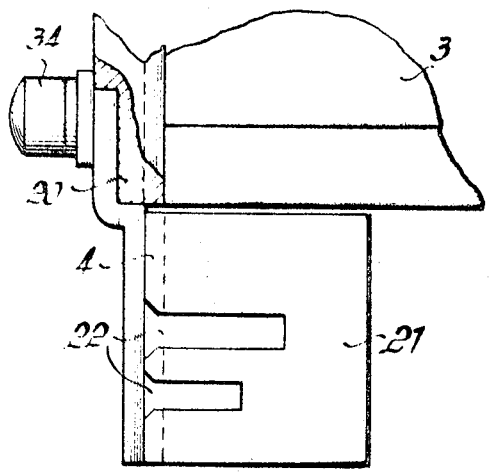
Figure 4C:
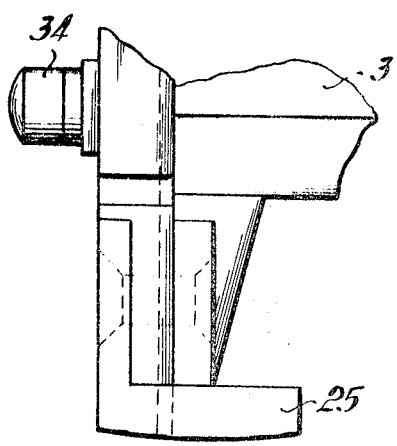
Figure 4B:
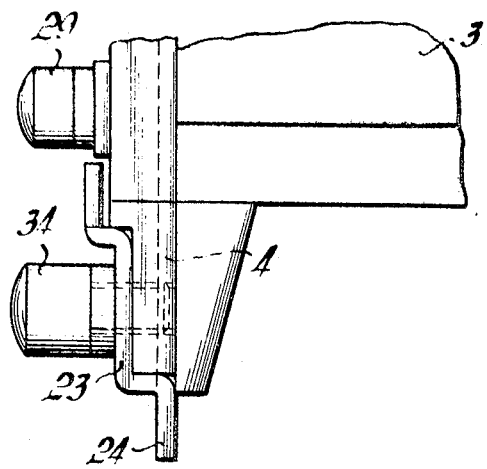
Figure 4D:
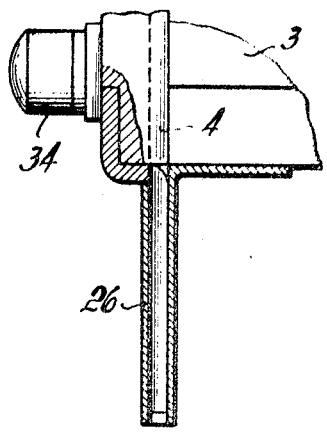

FIG. 1 is a side elevational view of a portable staple driving tool operated by compressed air, FIG. 2 is a fragmentary longitudinal section of the tool of FIG. 1, the area of the staple drive track being shown on an enlarged scale, FIG. 3a is a fragmentary front view of the staple drive track in the area of FIG. 2, FIG. 3b is a top plan view of the staple drive track of FIG. 3a, FIG. 3c is a transverse section taken in a plane along the line IIIC—IIIC of FIG. 3a, FIG. 3d is a front view as in FIG. 3a, but with the blocking mechanism being removed, FIG. 4a is a view of the lower end of the staple drive track with a front attachment for processing different types of fastening elements, FIG. 4b is a view like FIG. 4a but with a front attachment for a nailing operation on holed or slotted plates, FIG. 4c is a view like FIG. 4a but with a spherically shaped front attachment, and FIG. 4d is a view like FIG. 4a but with a front attachment for carrying out a nailing operation in slots or grooves.

The invention essentially resides in the front plate of the drive track which is longitudinally movable against string means, is guided in a longitudinal groove of the rear plate which is rigidly connected with the body of the device, and is provided with elements by which its movability is limited and by which the extent of penetration of the fasteners into the workpiece can be varied. The movable front plate of the staple drive track performs the function of the separate feeler of the conventional devices which becomes unnecessary. The nozzle of the staple drive track may therefore be of slender shape and may be used easily in concealed and less accessible points for carrying out stapling and nailing work.

It is advantageous to secure a notched plate to said front plate which notched plate can be adjusted in a desired position relative to the front plate. By this arrangement the extent of penetration of the fastener into the workpiece is modified in a simple manner without it being necessary to alter the stroke or working travel of the driver. So that the notched plate is safely fastened to the front plate even when the device is subjected to rough handling, for instance at building sites, it is desirable to provide the contacting surfaces of the plates with a roughening, knurling or with corrugations.

Another feature of the invention is to provide means at the front plate enabling attachment of additional or supplementary devices, which may be needed for nailing work at concealed points, for nailing work with ground plates, and for nailing on holed or slotted plates, or in grooves, which makes it possible to perform with the same device a large variety of fastening operations, particularly those required in the construction industry.

Referring more particularly to the drawings, the pneumatically operated portable device for driving staples is illustrated as a body 1 having a cylinder 1a in which a piston (not shown) slides. Compressed air is admitted to said cylinder via an air hose connection 2. Below the body 1 of the device, which is in the shape of a handle piece, a staple magazine 3 is provided in which the staples are contained in the form of a staple strip. The front end of magazine 3 is in communication with a staple drive track 4 in which a driver 7, which is connected to the piston, is movably guided. In its downward travel, the driver 7 separates a staple from the staple strip of the magazine, ejects it from the magazine and drives it through drive track 4 into a workpiece. The device is actuated by a trigger 5, which is pivotally connected to the body 1 and operatively associated with the valve for admission of compressed air actuating the piston.

A blocking lever 6 is provided to prevent actuation of the trigger 5 and thus insure that the device does not eject any staples from the staples drive track 4 when its nozzle does not engage a workpiece.

In FIGS. 2 and 3, which are shown on an enlarged scale, the structure and arrangement of the parts, particularly of the staple drive track 4 and blocking lever 6, are more distinctly shown.

The driver 7 is fastened to the pneumatically operated piston which is not shown in the drawings. In the lower terminal position of the piston, the driver 7 reaches the nozzle 10 at the lower end of the drive track 4. Drive track 4 is formed by an elongated recess or groove in a front plate 9 and is covered by a rear plate 8 and, in its lower area, by the front wall 3a of staple magazine 3. Parts 3, 3a and 8 are stationary against body 1. Front plate 9 is movable longitudinally of staple drive track 4 so that nozzle 10 can engage the workpiece 16. Superimposed on front plate 9 is a notched plate 11 the upper end 14 of which is bent at a right angle to provide a flange. A compression spring 17 bears against flange 14 and is received in a recess 18 of body 1. The spring force causes nozzle 10 of front plate 9 to be resiliently pressed toward the workpiece 16. Notched plate 11 is secured to front plate 9 by means of an adjusting screw 12 which extends through a slotted hole 13 of notched plate 11 and for vertical adjustment can be made to engage either of the two threaded bores 15 of front plate 9. To obtain a non-slipping contact in the area of engagement of notched plate 11 with front plate 9, the two plates 9 and 11 are each provided with knurlings or corrugations 19. It is therefore possible with screw 12 to fix notched plate 11 in a desired position relative to front plate 9.

The blocking lever 6 comprises a pair of parallel arms connected rigidly to the opposite edges of the notched plate 11. By adjusting said plate 11 longitudinally of staple drive track 4 in the front plate 9, the terminal position of the lower end of driver 7 relative to front plate 9 is adjusted, thereby regulating the extent of penetration of the fastener into the workpiece 16. As the rear plate 8 is rigidly connetced with the body 1 of the device and the terminal position of the lower end of driver 7 relative to the lower edge of rear plate 8 remains unchanged, one may by displacing notched plate 11 on front plate 9 adjust the position of nozzle 10 relative to the lower edge of rear plate 8. The adjustable position of nozzle 10 relative to the rigid parts 3, 3a and 8 therefore governs the terminal position of the lower end of driver 7 and at the same time the depth of penetration of the staple dirven into the workpiece by driver 7.

As mainly shown in FIGS. 3a to 3d, the front plate 9 is of relatively narrow shape and is movably retained in a stepped longitudinal groove 27 of plate 8 by a transverse latch 28 which is fastened to the rear plate 8 by means of two screws 29 engaging corresponding threaded bores 30 of plate 8. The opposite sides of rear plate 8 are embraced in a fork-like fashion by blocking lever 6, and the plate 8 is rigidly connected to body 1 of the device by screws 31 which from the rear engage threaded bores 32 of plate 8 (see FIG. 3d).

The extent of movement of the front plate 9 in an outward direction under the influence of the spring 17 is limited by engagement of the lower edge of plate 11 with the latch 28. When the nozzle 10 is pressed against the workpiece 16, the extent of inward movement of the front plate 9 is limited by engagement of the flange 14 with a fixed upper cross member 35 on the body of the tool. As shown in FIG. 2, the lower end 36 of the trigger 5 is shaped like a hook and is provided with a slot 37 into which a vertical plate portion 38 on the upper end of blocking lever 6 extends from beneath. In the inoperative position, as represented in FIG. 2, the vertical plate portion 38 of the blocking lever 6 lies in the path of the hook 36 of trigger 5 and blocks it. However, when the fastener driving device is pressed against a workpiece so as to shift the front plate 9, the blocking lever 6 is also moved upwardly and the vertical plate portion 38 is moved out of blocking relation with the trigger 5.

The lower portion of the movable front plate 9 is provided with an extension piece 20 of reduced thickness to carry supplementary implements which render is possible to perform special types of work in addition to nailing.

For example, the extension piece 20 may be provided with the supplementary implements shown in FIGS. 4a to 4d, which are held by screws 34 inserted in threaded bores 33. The supplementary implement of FIG. 4a enables the staples to secure additional elements of various shapes into the workpiece. The additional elements are one by one put into recesses 22 of an attachment 21 which is connected to the extension piece 20 by said two screws 34. The staple driven by driver 7 at first grips and penetrates the additional element and, on further thrust of driver 7, fastens it to the workpiece.

The attachment 23 shown in FIG. 4b is used for nailing work on holed or slotted building boards. To ensure precise alignment of the nozzle and of the staple drive track 4 a feeler part 24 engages the hole or slot of the building board on either side of the point of nailing.

The attachment 23 is fastened on front plate 9 which is movable longitudinally of staple drive track 4. Compressed air can be admitted to the device by manipulation of trigger 5 after a displacement of nozzle 10 in the direction of staple drive track 4 when the feeler part 24 touches the bottom of the slot. This ensures proper functioning of the safety mechanism.

The supplementary device of FIG. 4c has a convex lower bearing surface 25 which is used when fasteners are driven into soft materials to prevent nozzle 10 to be forced into the work piece, on which it is placed. In this embodiment the staple drive track 4 extends through the bearing surface 25.

The attachment shown in FIG. 4d provides for precise alignment of a staple which is to be driven into a groove by insertion into the groove of a staple drive track extension 26.

The device according to this invention has the further advantage that the front plate 9 of the staple drive track 4 after loosening the notched plate 11 can be pulled down freely from the body 1 of the device, whereby disturbances in the feeding of the staples e.g. by jammed staples, can be cleared easily and with shorter interruptions of working conditions.

The device may not only be used for driving U-shaped staples but also other fasteners, such as nails, bolts, clamps, and the like.

It is apparent that the examples shown above have been given solely by way of illustration and not by way of limitation and that they are subject to variations and modifications within the scope of the present invention.

I claim:

1. In a portable fastener driving device operated by air pressure and comprising a body, piston and cylinder means in said body including a driver for driving fasteners into a workpiece, a manually operable trigger for regulating the supply of air to said piston and cylinder means, means including a front plate and a rear plate defining a drive track for guiding said driver, a nozzle forming the outlet of said drive track, and blocking means movable between operative and inoperative positions, said blocking means being cooperable with said trigger for preventing actuation of the latter except when said blocking means is in said operative position in response to pressing the device against a workpiece; the improvement which comprises means rigidly securing the rear plate of said drive track to said body, means movably guiding the front plate of said drive track relative to said rear plate, connecting means interconnecting said blocking means with said front plate for movement therewith, said connecting means being spaced from said nozzle, and resilient means normally urging said blocking means into its inoperative position relative to said body.

2. A device according to claim 1, wherein said rear plate is provided with an elongated groove having said front plate slidable therein, and said resilient means comprises spring means operatively coacting between said body and said front plate.

3. A device according to claim 1, wherein said connecting means is adjustably secured to said front plate for varying the driving depth of the fasteners into the workpiece.

4. A device according to claim 3, wherein said front plate and said connecting means have roughened contact surfaces for holding the same in adjusted relation.

5. A device according to claim 1, wherein the lower end of said front plate comprises an extension portion having means for detachably mounting supplementary implements thereon.

References Cited

UNITED STATES PATENTS

| 2,918,675 | 12/1959 | Smith | 227—66 |
| 2,801,415 | 8/1957 | Jenny. | |
| 3,278,106 | 10/1966 | Becht et al. | 227—8 |
| 3,352,471 | 11/1967 | Fisher | 227—8 XR |

FOREIGN PATENTS 1,028,071  5/1966  Great Britain.

GRANVILLE Y. CUSTER, JR., Primary Examiner